UNITED STATES PATENT OFFICE.

ISIDOR KITSEE, OF PHILADELPHIA, PENNSYLVANIA.

TREATING LIQUOR FROM REDUCING PROCESSES OF NITRATED COAL-TAR DERIVATIVES.

1,298,513.     Specification of Letters Patent.     Patented Mar. 25, 1919.

No Drawing.     Application filed January 26, 1918. Serial No. 213,970.

*To all whom it may concern:*

Be it known that I, ISIDOR KITSEE, a citizen of the United States, residing at Philadelphia, in the county of Philadelphia and State of Pennsylvania, have invented certain new and useful Improvements in Treating Liquor from Reducing Processes of Nitrated Coal-Tar Derivatives, of which the following is a specification.

My invention relates to an improvement in treating liquor from reducing process of nitrated coal-tar derivatives and has more special reference to such nitrated derivatives as are useful for the production of dyes.

It is well understood that nitrated derivatives have to undergo a reducing process before the intermediates are completed. For this purpose the nitrated material is placed in a reservoir (still) with the addition of a diluted acid of about the same quantity. In some cases hydrochloric acid is used and in other cases sulfuric acid. In the still the nitrated material is subjected in conjunction with the acid to agitation so that each particle of the nitrated material may come in contact with the acid. During this agitation a metal in divided state, such as zinc or iron, is dropped into the combined solution and through the forming of the acid salt, hydrogen is released reducing the nitrated material. In most cases, at one and the same time, the nitrated material loses molecules of its carbon component.

After the reducing process is completed, the liquor is neutralized with the aid of a caustic and the metal is thrown down as an oxid combined in most cases with the carbon molecules. The so-neutralized liquor and the metal oxid is today looked upon as a waste product not useful for any purpose.

It is the aim of my invention to save the metal and it is also the purpose of my invention to save the acid even if in a changed form.

To practise my invention, I make use of an electrolytic apparatus, by preference a two-compartment apparatus and place, by preference, the liquor before it is neutralized in the positive compartment of this apparatus. The negative compartment may be filled with plain water, made conductive with an alkali. Currents of electricity are sent through this apparatus. In a short time the acid radical releases the metal and also the carbon and the metal is then deposited onto the negative electrode, in some instances as a very dense deposit and in some instances in a porous or spongy condition. It is advised that the negative electrode should either be black leaded or be made out of carbon, so that the deposited metal can easily be stripped therefrom.

For the purpose of my invention it is immaterial if the original acid is a hydrochloric and the salt therefore a chlorid or if the original acid is a sulfuric and the produced salt a sulfate. For the purpose of my invention it is also immaterial if this metal consists of iron or zinc.

Having now described my invention what I claim as new and desire to secure by Letters Patent is:—

1. The process which consists in electrolyzing out of the liquor, used to reduce nitrated coal-tar derivatives, the metal in its metallic state at one and the same time as the acid radical is electrolyzed out of said liquor.

2. The method of treating liquor from the reducing process of nitrated coal-tar derivatives which consists in freeing the acid radical from the metal and carbon contained in said liquor through electrolytic action.

In testimony whereof I affix my signature in the presence of two witnesses.

ISIDOR KITSEE.

Witnesses:
    FRANCES RUTHERFORD,
    JOHN J. RUTHERFORD.